(12) United States Patent
Lee et al.

(10) Patent No.: US 8,098,650 B2
(45) Date of Patent: Jan. 17, 2012

(54) APPARATUS AND METHOD FOR PROCESSING CONTENTS USING ROUTING TABLE

(75) Inventors: Dongman Lee, Daejeon (KR); JiSun An, Daejeon (KR); YangWoo Ko, Daejeon (KR)

(73) Assignee: Korea Advanced Institute of Science and Technology, Daejon (KR)

( * ) Notice: Subject to any disclaimer, the term of this patent is extended or adjusted under 35 U.S.C. 154(b) by 153 days.

(21) Appl. No.: 12/457,662

(22) Filed: Jun. 18, 2009

(65) Prior Publication Data

US 2010/0135306 A1    Jun. 3, 2010

(30) Foreign Application Priority Data

Nov. 28, 2008   (KR) .................. 10-2008-0119934
May 18, 2009    (KR) .................. 10-2009-0043133

(51) Int. Cl.
    *H04L 12/28*         (2006.01)
(52) U.S. Cl. ................... 370/351; 370/395.31
(58) Field of Classification Search ........... 370/389, 370/392, 252, 351; 709/249
    See application file for complete search history.

(56) References Cited

U.S. PATENT DOCUMENTS

| | | | | |
|---|---|---|---|---|
| 7,532,620 B2 * | 5/2009 | Sudo et al. | | 370/389 |
| 7,768,995 B2 * | 8/2010 | Yang et al. | | 370/351 |
| 2002/0167898 A1 * | 11/2002 | Thang et al. | | 370/216 |
| 2003/0120817 A1 * | 6/2003 | Ott et al. | | 709/249 |
| 2005/0135379 A1 * | 6/2005 | Callaway et al. | | 370/395.31 |
| 2008/0031236 A1 * | 2/2008 | Yang et al. | | 370/389 |
| 2008/0170550 A1 * | 7/2008 | Liu et al. | | 370/338 |
| 2009/0296710 A1 * | 12/2009 | Agrawal et al. | | 370/392 |
| 2010/0091685 A1 * | 4/2010 | Agrawal et al. | | 370/254 |
| 2010/0157818 A1 * | 6/2010 | Kobayashi | | 370/252 |

OTHER PUBLICATIONS

"Social-relation Aware Routing Protocol in Mobile Ad hoc Network", Jisun An et al., 3$^{rd}$ International Conference on Future Internet CFI 2008, Jun. 2008.
Korean Office action issued in Korean application No. 10-2009-0043133, dated Jan. 7, 2011, 5 pages.
Jisun An et al., "Social-relation Aware Routing Protocol in Mobile Ad hoc Networks," Journal of the Korean Institute of Information Scientists and Engineers: Computing Practices and Letters, Nov. 15, 2008, pp. 798-802, vol. 14, No. 8.

* cited by examiner

*Primary Examiner* — Phirin Sam
(74) *Attorney, Agent, or Firm* — Bacon & Thomas, PLLC

(57) ABSTRACT

A routing apparatus includes: a routing table management unit for generating a routing table by receiving interest information of a user of a mobile node, and for broadcasting the routing table through the mobile ad hoc network; an effectiveness calculation unit for calculating effectiveness values for respective paths, included in a routing table broadcasted by some other external node, based on both the interest information of the user of the mobile node and interest information of users of destination nodes of the respective paths when the routing table is received from the other external node; a storing unit for storing the generated routing table; and a routing path setting unit for setting a routing path on the basis of the routing table stored in the storage unit. The routing table management unit updates the routing table using the effectiveness values for respective paths calculated by the effectiveness calculation unit.

9 Claims, 6 Drawing Sheets

| PATH A | | USER INTEREST A | EFFECTIVENESS A |
|---|---|---|---|
| PATH B | | USER INTEREST B | EFFECTIVENESS B |
| PATH C | | USER INTEREST C | EFFECTIVENESS C |
| ⋮ | ⋮ | | ⋮ |

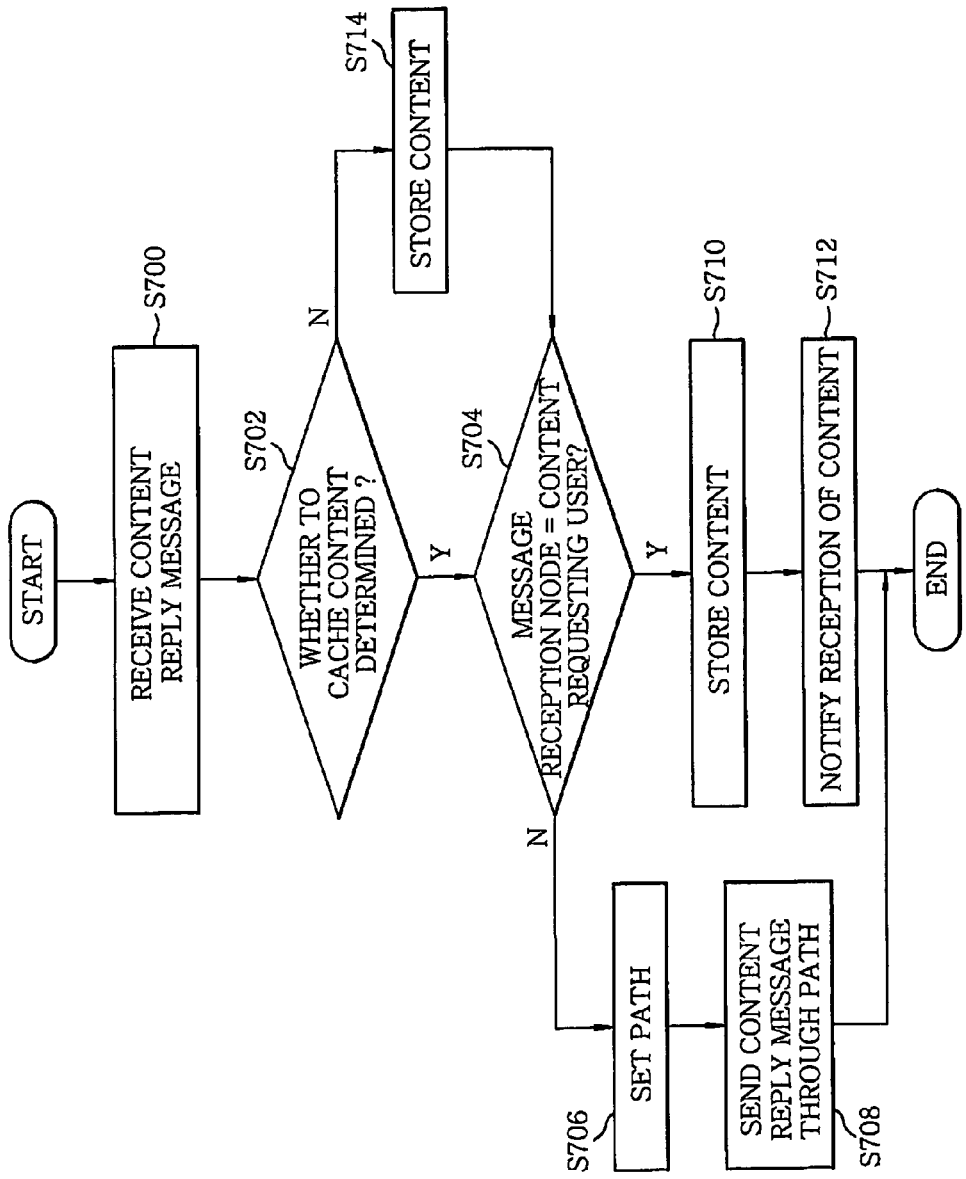

APPARATUS AND METHOD FOR PROCESSING CONTENTS USING ROUTING TABLE

CROSS REFERENCE TO RELATED APPLICATIONS

This application has a claim of priority to Korean application No. 10-2008-0119934 filed on Nov. 28, 2008 and Korean application no. 10-2009-0043133 filed on May 18, 2009. The disclosures of the applications are incorporated herein by reference in their entirety.

FIELD OF THE INVENTION

The present invention relates, in general, to routing in a mobile ad hoc network, and, more particularly, to an apparatus and method for processing contents using a routing table.

BACKGROUND OF THE INVENTION

As a range in which content sharing applications such as Mobile Social Software (MoSoSo) is applied gradually increases, contents have been gradually used by a variety of users. Users are grouped depending on their common interests, and, generally, members in each group exchange content with each other.

Contents are media to express user's experiences or interests, and the sharing thereof can be a method for creating and maintaining social relationships.

A contents request/reply function is the most important part in the execution of contents sharing applications. In order to support this function, a routing technique is required to transmit contents, and a contents caching technique can be used to improve performance in retrieving contents. In fact, caching and routing in a mobile ad hoc network are closely related to each other. Caching is for improving the efficiency of multi-hop request/reply, and a path through which content is transferred (that is, determining who will transmit contents and which contents will be transmitted and cached) is determined by routing.

Therefore, a request for contents needs be transmitted along a path in which the probability of obtaining the requested contents is high, and a reply for contents must be transmitted along a path in which the probability of caching contents received as a reply for later use is high.

Therefore, although routing protocols need to be operated in cooperation with a caching scheme, Internet Protocol (IP) routing protocols in a conventional mobile ad hoc network consider only their own efficiency.

Further, as described above, when contents are shared between members of a group having a similar interest, it can be predicted who will consume contents and which contents will be consumed from the fact that two users' interests are similar to each other. That is, content request/reply efficiency can be improved by applying the users' interests to routing.

Up to date, research on various techniques for applying the requirements of applications to routing protocols has been conducted. For example, there has been research into a technique which considers the Quality of Service (QoS) of an application to be a principal factor used in determining a routing path.

However, no conventional routing method presents technology which considers users' interests as a principal factor to set a routing path for a mobile ad hoc network.

SUMMARY OF THE INVENTION

In view of the above, the present invention provides a routing technique using on users' interests (application level information) which cooperates with a caching technique, so that contents are more rapidly obtained and network burden caused by various requests for the same contents is reduced, thus more efficiently supporting applications such as content sharing.

In accordance with a first aspect of the present invention, there is provided a routing apparatus including: a routing table management unit for generating a routing table by receiving interest information of a user of a mobile node, and for broadcasting the routing table through the mobile ad hoc network; an effectiveness calculation unit for calculating effectiveness values for respective paths, included in a routing table broadcasted by some other external node, based on both the interest information of users of the mobile nodes along a path and interest information of users of destination nodes of the respective paths when the routing table is received from the other external node; a storing unit for storing the generated routing table; and a routing path setting unit for setting a routing path on the basis of the routing table stored in the storage unit.

The routing table management unit updates the routing table using the effectiveness values for respective paths calculated by the effectiveness calculation unit.

In accordance with a second aspect of the present invention, there is provided an apparatus for processing contents based on matching between users' interests, including: a routing table for storing interest information of users and effectiveness values for respective paths; and a routing path setting unit for searching for paths having a destination node identical to that included in a content request message or a content reply message attributable to an external content request, and sending the content request message or the content reply message through a path having a highest effectiveness value selected from among found paths.

In accordance with a third aspect of the present invention, there is provided a method of updating a routing table in each node in a mobile ad hoc network environment, including: a certain node receiving a specific path for which interest information of a user of a destination node and an effectiveness value thereof are set; calculating an effectiveness value based on both the interest information of the user of the destination node and interest information of a user of the certain node; setting the calculated effectiveness value in the specific path and adding the specific path to a routing table included in the certain node when the specific path is not present in the routing table; and updating paths included in the routing table by comparing the calculated effectiveness value with effectiveness values of paths included in the routing table when the specific path is present in the routing table.

In accordance with a fourth aspect of the present invention, there is provided a method of processing contents, the method processing a content request message using a routing table, including: when the content request message is received, figuring out whether content corresponding to the content request message is present; and when content corresponding to the content request message is not present, selecting a path having a highest effectiveness value from among paths having a destination node identical to that included in the content request message by searching the routing table, and then sending the content request message through the selected path.

In accordance with a fifth aspect of the present invention, there is provided a method of processing content, the method processing a content reply message using a routing table for storing interest information of users and effectiveness values for respective paths.

The method includes, when the content reply message is received, determining whether to cache content by comparing content characteristics of the content reply message with interest information of a user set in a routing table of a node which received the content reply message; when a destination node of the content reply message is the node which received the content reply message after determining whether to cache the content, notifying an application that requested content has been received; and when the destination node is not the node which received the content reply message, selecting a path having a highest effectiveness value from among paths having a destination node identical to that included in the received content reply message by searching the routing table, and then sending the content reply message through the selected path.

In accordance with the above aspects, the present invention provides a routing technique using users' interests (application level information) which cooperates with a caching technique, so that contents are more rapidly obtained and network burden caused by various requests for the same contents is reduced, thus more efficiently supporting applications such as content sharing.

BRIEF DESCRIPTION OF THE DRAWINGS

The above and other objects and features of the present invention will become apparent from the following description of preferred embodiments given in conjunction with the accompanying drawings, in which:

FIG. 7 is a flowchart showing a process for processing a content reply message in accordance with the present invention.

DETAILED DESCRIPTION OF THE EMBODIMENTS

Hereinafter, embodiments of the present invention will be described in detail with reference to the accompanying drawings.

Figures 1, 2:
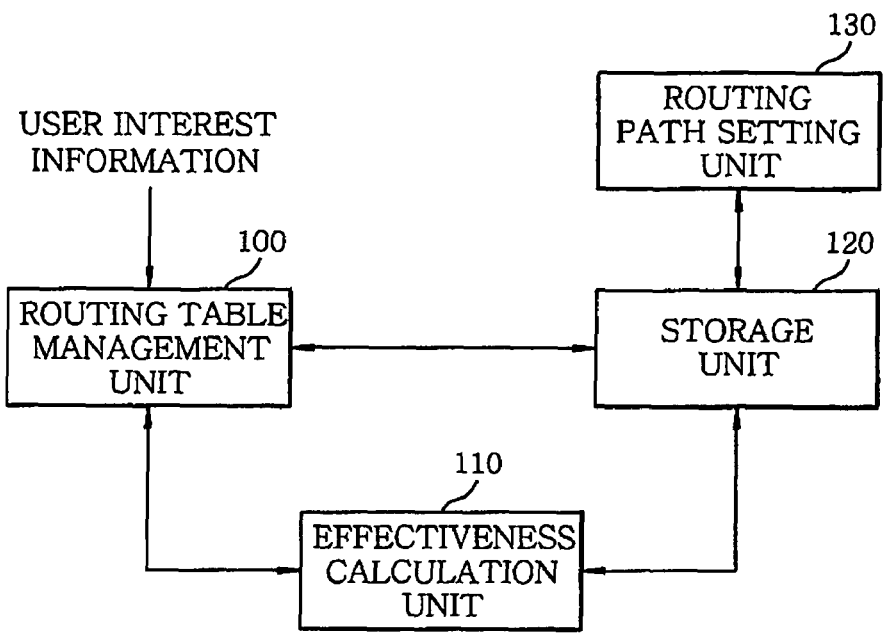
FIG. 1 is a block diagram showing a routing apparatus for configuring a routing table based on matching between users' interests and setting routing path in accordance with the present invention.
FIG. 2 is a diagram showing the structure of a routing table in accordance with the present invention.

FIG. 1 is a block diagram showing a routing apparatus for configuring a routing table based on matching between user's interests and setting routing path. The routing table is configured by the routing apparatus in each mobile node, e.g., a mobile terminal, in a mobile ad hoc network environment.

Referring to FIG. 1, the routing table configuration apparatus includes a routing table management unit 100, an effectiveness calculation unit 110, a storage unit 120, and a routing path setting unit 130.

The routing table management unit 100 generates an initial routing table by receiving the interest information of users of respective mobile nodes, and then stores the initial routing table in the storage unit 120. In paths of the initial routing table, the mobile node itself is set as a destination node, and the interest information of the user is set as well. Further, the routing table management unit 100 generates an update message required to update the routing tables of neighboring nodes by using the initial routing table, and sends the update message to the neighboring nodes by broadcasting the update message through the mobile ad hoc network. That is, the routing tables stored in the storage units 120 of respective nodes are exchanged with each other through periodic broadcast. Each node stores therein all received routing tables. That is, by storing the received paths to a destination, all possibilities can be considered. When a routing table is broadcasted via one chosen single path, and thus a network overhead can be reduced.

The routing table management unit 100 receives an update message including a routing table required to update the routing table from another external node, i.e., an adjacent neighboring node, and provides it to the effectiveness calculation unit 110.

When receiving the update message from the routing table management unit 100, the effectiveness calculation unit 110 calculates energy-aware coverage-preserving hierarchical routing values, i.e., ECHR( ) values, through matching between the interest information of the users of the destination nodes of respective paths set in the routing table in the update message and the interest information of the user set in the initial routing table stored in the storage unit 120. Then the effectiveness calculation unit 110 calculates effectiveness values for respective paths on the basis of the ECHR( ) values, and provides the calculated effectiveness values for respective paths to the routing table management unit 100.

The routing table management unit 100 updates the initial routing table stored in the storage unit 120 by using both the effectiveness values for respective paths and the routing table included in the update message.

The structure of the routing table in accordance with the present invention includes paths to destinations, as shown in FIG. 2. For the respective paths, the addresses of destinations, user's interests of the destinations, the number of hops present in the path to each destination, effectiveness values, sequence numbers, flags and the like are set.

The routing path setting unit 130 sets a routing path on the basis of the routing table stored in the storage unit 120.

A method of configuring the routing table based on matching between users' interests is implemented by using a DSDV (Destination-Sequenced Distance Vector) routing technique. The DSDV routing technique uses the above-described table update technique to easily evaluate performance, unlike the conventional DSDV routing technique which improves the precision of a routing table by exchanging tables with each other when a link error occurs, and selects a routing path using an effectiveness value, unlike the conventional DSDV routing technique which uses the number of hops as a criterion required to select a routing path.

The routing path setting unit 130 searches for a routing path by using the above-described DSDV routing technique of the present invention. That is, the routing path setting unit 130 selects a routing path on the basis of effectiveness values for respective paths set in the routing table, as shown in FIG. 2. Here, the effectiveness values for respective paths are calculated based on the users' interests. A high effectiveness value means a high probability that intermediate nodes present in a corresponding path will consume contents transmitted to the destination node. Accordingly, a path having the highest effectiveness value is selected among paths to the destination node.

When receiving a routing table from another node, i.e., an adjacent neighboring node, each intermediate node calculates the ECHR( ) value for a destination node. The ECHR( ) is a function for matching the users' interest information (content characteristics) of destination nodes of respective paths included in the routing table received from the neighboring node, with the user's interest information (content characteristics) the intermediate node itself. When it is assumed that the interest information (content characteristics) of the user is represented by a real number between 0 and 1, the difference between two real numbers indicates the similarity between two users' interests or the degree of the users' interests in contents. The content characteristics may be contents information frequently used by each node user.

The effectiveness calculation unit 110 calculates effectiveness values in consideration of the number of hops together with a probability that intermediate nodes, present in respective paths included in the routing table, will consume the contents transmitted to the destination nodes of the paths. That is, the effectiveness values may be calculated using the following Equation 1.

$$U(d) = \frac{\sum_{i \in I}(1-e)^{N_i} \cdot ECHR(I_i, I_d)}{h},$$ Eq. 1 wherein I is a set of intermediate nodes present in the path to a destination node d, $I_i$ is user's interest of each intermediate node, $I_d$ is user's interest of the destination node, e is a link error rate, $N_i$ is the number of hops from the intermediate node $I_i$ to the destination node d, and h is the number of hops to the destination node d.

When a routing path is selected, if the sums of ECHR ( ) values of two paths are identical to each other in the above Equation 1, the routing path setting unit 130 selects a path having a less number of hops or selects a path having a sufficiently high effectiveness value (above a preset effectiveness value) depending on a link error rate even if the path is not the shortest distance path.

When a link error rate is greater than a preset value, the routing path setting unit 130 of the present invention selects the shortest distance path, instead of the path having the highest effectiveness value.

A process, i.e., a protocol, for configuring a routing table by the routing apparatus in accordance with the present invention will be described with reference to FIG. 3.

Figure 3:
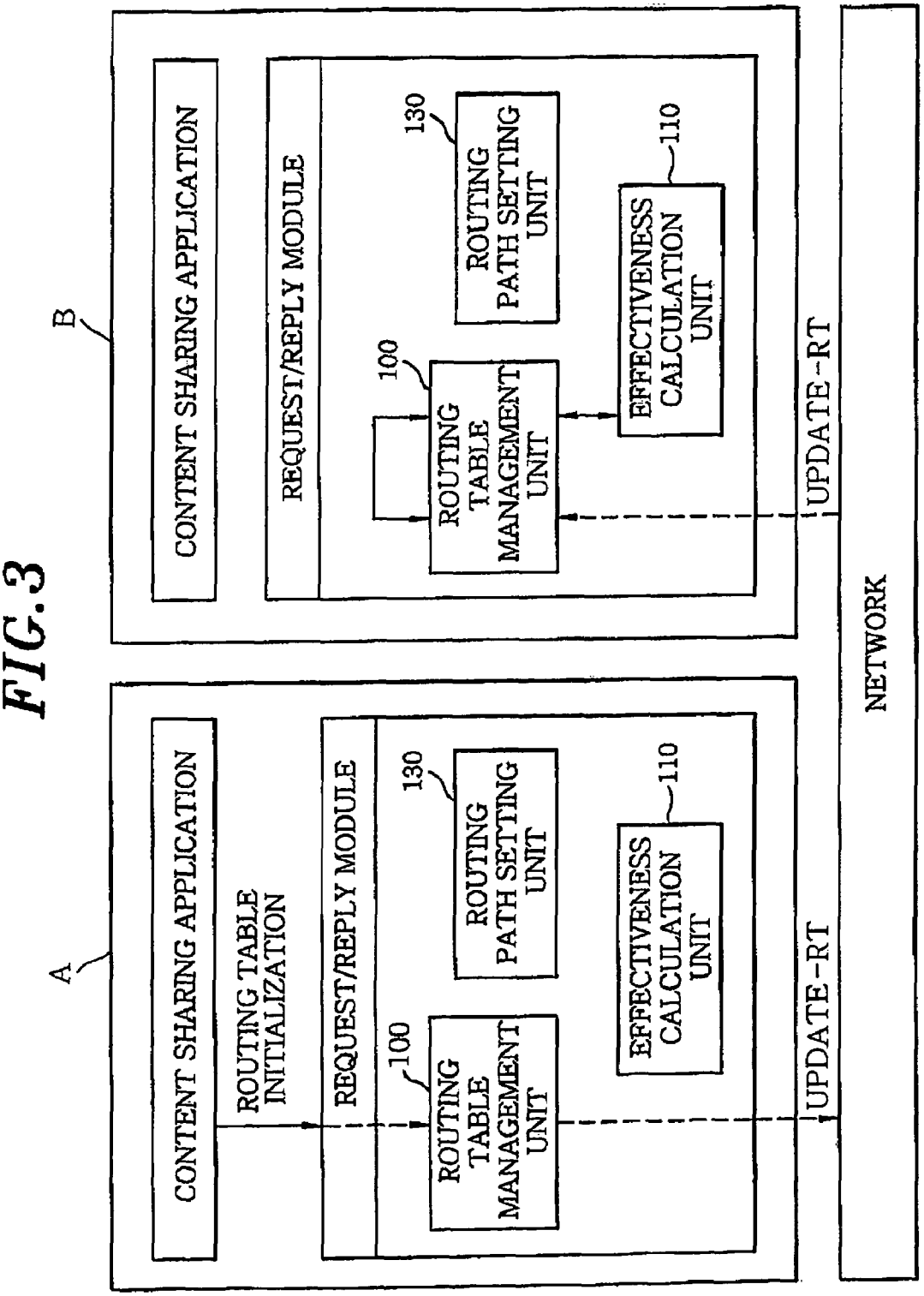
FIG. 3 is a diagram showing a process for configuring a routing table in accordance with the present invention.

FIG. 3 is a diagram showing a process for configuring (i.e., generating and updating) a routing table in accordance with the present invention.

Referring to FIG. 3, first, the routing table management unit 100 of the routing table configuration apparatus in a mobile node A performs an initialization process for generating a routing table in the storage unit 120.

Next, the routing table management unit 100 generates an initial routing table by using its user's interest information and stores the initial routing table in the storage unit 120, thus completing the generation of the initial routing table.

The routing table management unit 100 broadcasts an update message with the routing table including information of node itself and other nodes, i.e., a message "UPDATE-RT", to neighboring nodes through a mobile ad hoc network (1-hop broadcast).

Then, a mobile node B, as a neighboring node, receives the update message "UPDATE-RT". The routing table management unit 100 of the mobile node B updates the routing table stored in the storage unit 120 using a routing table update algorithm. The above process except initialization of routing table is periodically repeated, so that routing information about other nodes existing in a distance of more than 1 hop can be obtained.

In the above process, the operation of managing the initial routing table and updating the routing table in the storage unit 120 may be performed by the request/replay (Req/rep) module of the node.

The process in which the mobile node B updates the routing table stored in its own storage unit 120 will be described in detail with reference to FIG. 4.

Figure 4:
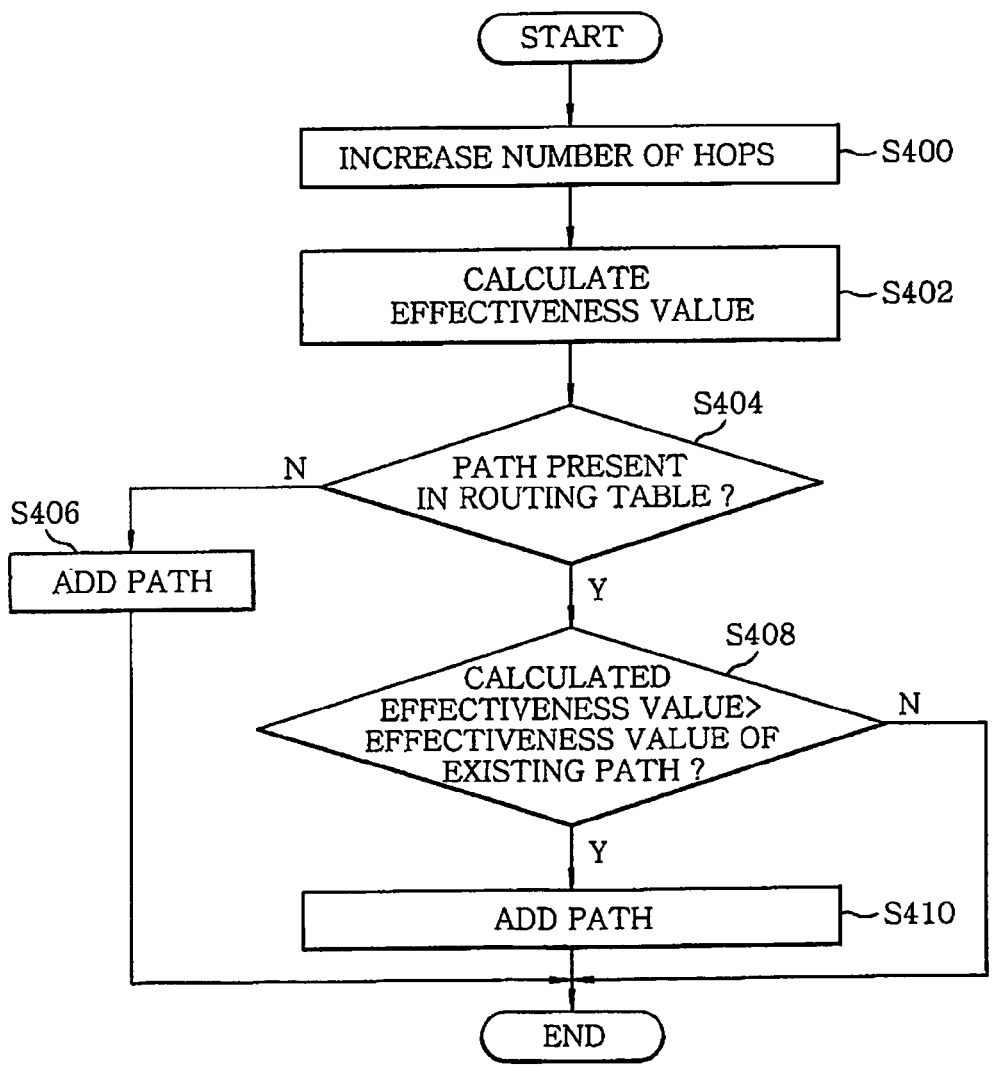
FIG. 4 is a flowchart showing a process for updating a routing table according to the present invention.

FIG. 4 is a flowchart showing a process for updating a routing table in accordance with the present invention. This process is performed by each path in broadcasted routing table and routing table entry will be added or replaced by broadcasted path.

First, the routing table management unit 100 increases the number of hops for a broadcasted path by one at step S400.

Next, the effectiveness calculation unit 110 calculates an effectiveness value for a broadcasted path. That is, the effectiveness calculation unit 110 calculates the ECHR( ) value by using user's interest information of its own node, user's interest information of a destination node, and cumulated effectiveness value of broadcasted path, and then calculates an effectiveness value by applying the ECHR( ) value to Equation 1 at step S402. The calculated effectiveness value is provided to the routing table management unit 100.

The routing table management unit 100 determines whether a broadcasted path, i.e., a broadcasted destination node, is present in the routing table stored in the storage unit 120 at step S404.

If it is determined at step S404 that the path is not present, the routing table management unit 100 adds the broadcasted path to the routing table in the storage unit 120 at step S406, thus updating the routing table.

Meanwhile, if it is determined at step S404 that the broadcasted path is present in the routing table, the routing table management unit 100 compares the calculated effectiveness value with the effectiveness value set in an existing path at step S408.

As a result of the comparison at step S408, when the calculated effectiveness value is greater than that set in the existing path, the routing table management unit 100 replaces existing path in the routing table of the storage unit 120 at step S410 to the broadcasted path, thus updating the routing table.

On contrary, as a result of the comparison at step S408, when the calculated effectiveness value is equal to or less than that set in the existing path, there is no updating and the process is ended.

A process for setting a routing path through cooperative operation between routing and caching in accordance with the present invention will be described with reference to FIGS. 5 and 6.

It is noted that a path is generated using a routing technique based on matching between users' interests and content request/reply are transmitted along this path. An intermediate node having a received content request message checks its own cache, and replies to the request with contents when it has the requested contents. When the intermediate node does not have the contents, it transfers the request message to a subsequent node. During the reply to the content request, respective intermediate nodes can cache the contents. Whether to cache the contents is determined through matching between each user's interest and content characteristics.

In this way, in accordance with the present invention, routing and caching are cooperatively operated, so that a path to which a larger number of users having a similar interest belong is found, and performance can be improved when content request/reply messages are sent through this path. That is, when a request for contents is made, a reply can be more rapidly received from a closer node. When a reply to the content request is made, a network layer needs to be able to cache contents in order to provide an opportunity to cache contents in preparation for later requests.

Figure 5:
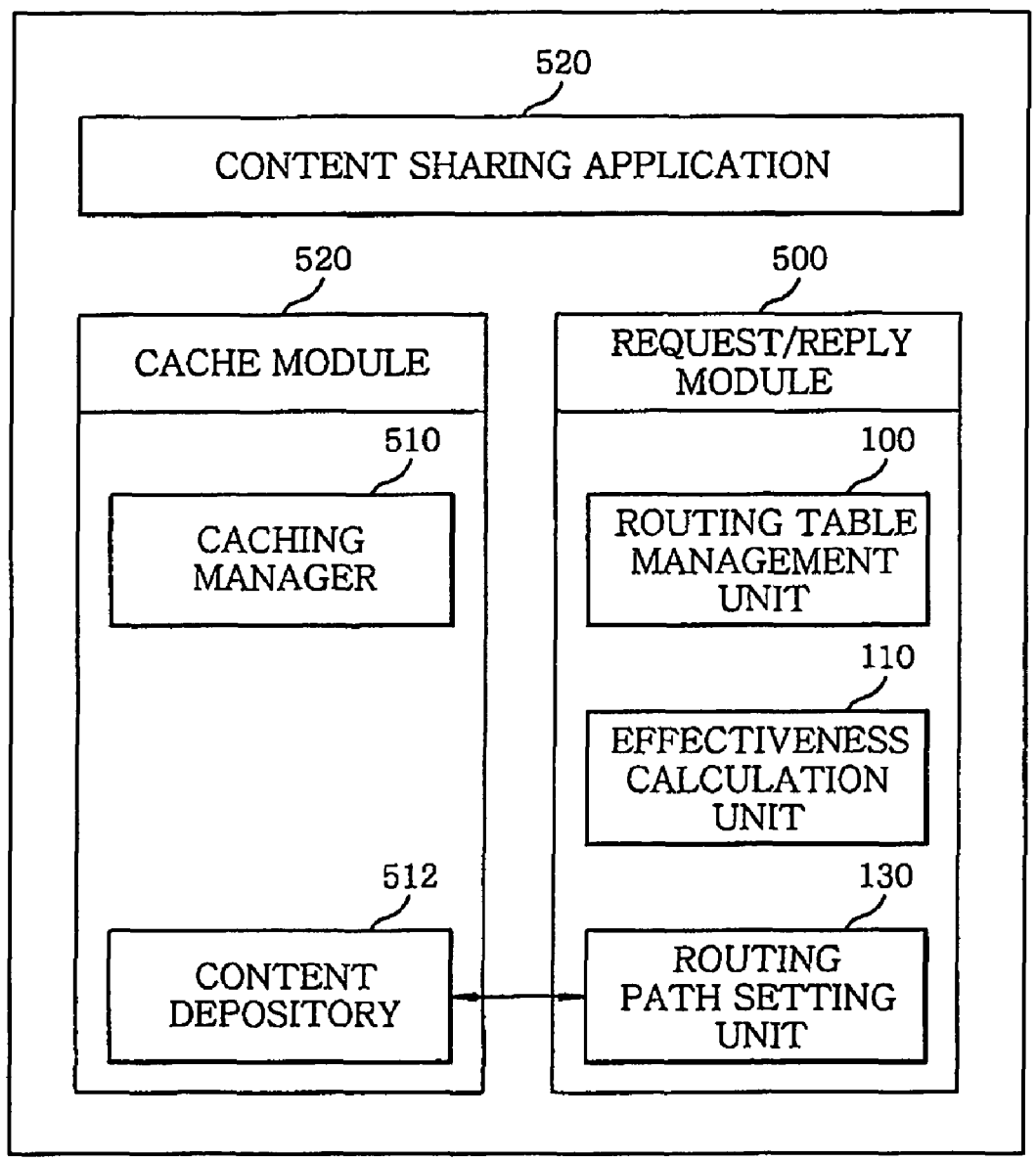
FIG. 5 is a diagram showing a protocol required for processing a content request in accordance with the present invention.
Figure 6:
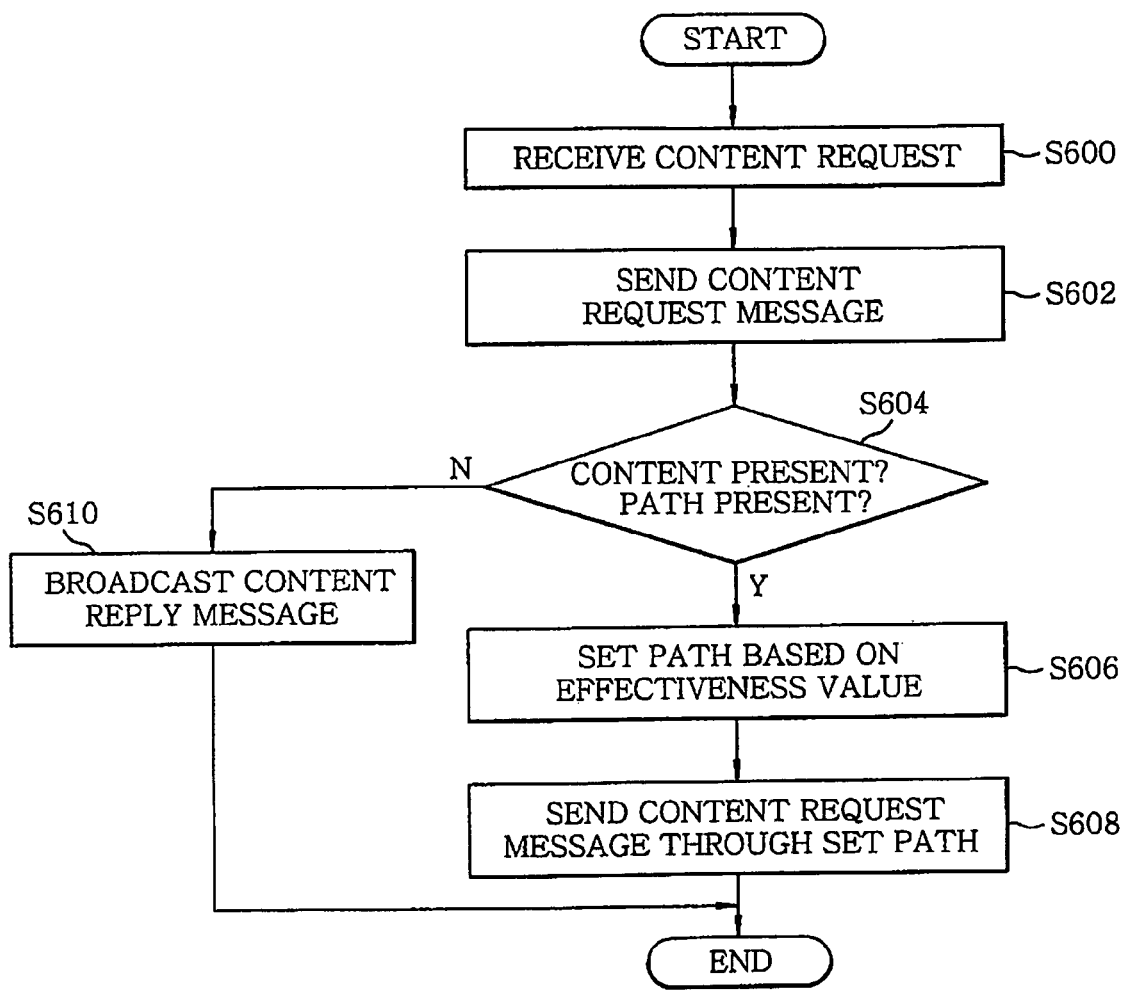
FIG. 6 is a flowchart showing a process for processing a content request message in accordance with the present invention.

FIG. 5 is a diagram showing a protocol in which caching and routing are operated in cooperation with each other when processing a content request in accordance with to the present invention, and FIG. 6 is a flowchart showing a process for processing a content request through the cooperation between caching and routing.

As shown in FIG. 5, the protocol in which caching and routing are operated in cooperation with each other includes a request/reply module 500, which has a routing table management unit 100 for managing a routing table stored in a storage unit 120, an effectiveness calculation unit 110 and a routing path setting unit 130, and a cache module 520 which has a caching manager 510 and a content storage part 512. The request/reply module 500 receives and processes a content request in cooperation with a upper content sharing application 530, and thereafter transfers a reply to the content request to the content sharing application 530 when the reply is received.

The process for processing a content request using the protocol having the above structure is described below.

First, as shown in FIG. 6, the request/reply module 500 receives a content request from the content sharing application 530 upon a content request received from a user (content requesting user) at step S600. Then, the request/reply module 500 sends a content request message "REQUEST-CONTENT" required to request specific contents to a mobile node of another user through the path obtained by the routing path setting unit 130 at step S602.

The routing path setting unit 130 of the mobile node of another user determines whether requested contents are present in its own content storage part 512 through a query request at step S604.

If it is determined at step S604 that contents are not present, the routing path setting unit 130 sets a path on the basis of the routing table stored in the storage unit 120 at step S606, in such a way as to request and obtain a path from the routing table management unit 100. That is, the routing path setting unit 130 extracts one or more paths having a destination identical to a destination node included in the content request message by searching the routing table stored in the storage unit 120, searches the extracted paths for a path having the highest effectiveness value, determines a subsequent node to which a content request is to be transmitted on the basis of the found path, and sends a content request message to the determined subsequent node at step S608.

If it is determined at step S604 that content is present, the routing path setting unit 130 sets a path on the basis of the routing table while generating a content reply message, thus broadcasting the content reply message "REPLY-CONTENT" through the path at step S610.

FIG. 7 is a flowchart showing a process for processing a content reply in accordance with the present invention.

As shown in FIG. 7, when a certain mobile node receives a content reply message "REPLY-CONTENT" from a mobile node at step S700, the routing path setting unit 130 of the certain mobile node requests the caching manager 510 in the cache module 520 to determine whether to cache content received as a reply through a query request at step S702. That is, the caching manager 510 determines whether to store the content, included in the content reply message "REPLY-CONTENT", in the content storage part 512 by comparing the interest information of the user of the certain mobile node with content characteristics included in the content reply message "REPLY-CONTENT".

If it is determined at step S702 that caching is not necessary, the routing path setting unit 130 determines whether the user of the certain mobile node is a user who requested contents (destination node) on the basis of the content reply message "REPLY-CONTENT" at step S704.

If it is determined at step S704 that the user of the certain mobile node is not a user who requested content, the routing path setting unit 130 performs a path setting operation, i.e., an operation of selecting a path through steps S606 and S608 in FIG. 6, at step S706, and thereafter sends the content reply message "REPLY-CONTENT" to a destination node at step S708.

If it is determined at step S704 that the user of the certain mobile node is the user who requested content, the routing path setting unit 130 transmits the content to the caching manager 510, thus enabling the content to be stored in the content storage part 512 at step S710. Since the destination node of the content is the user's own node, notification of the reception of content is provided to the content sharing application 530 at step S712.

Meanwhile, if it is determined at step S702 that caching is necessary, the caching manager 510 stores the contents, included in the content reply message "REPLY-CONTENT", in the content storage part 512 at step S714, and thereafter proceeds to step S704 to perform subsequent steps.

While the invention has been shown and described with respect to the preferred embodiments, it will be understood by those skilled in the art that various changes and modifications may be made without departing from the spirit and scope of the invention as defined in the following claims.

What is claimed is:

1. A routing apparatus comprising:
a routing table management unit for generating a routing table by receiving interest information of a user of a mobile node, and for broadcasting the routing table through the mobile ad hoc network;
an effectiveness calculation unit for calculating effectiveness values for respective paths, included in a routing table broadcasted by some other external node, based on both the interest information of the user of the mobile node and interest information of users of destination nodes of the respective paths when the routing table is received from the other external node;
a storing unit for storing the generated routing table; and
a routing path setting unit for setting a routing path on the basis of the routing table stored in the storage unit,
wherein the routing table management unit updates the routing table using the effectiveness values for respective paths calculated by the effectiveness calculation unit, and
wherein the effectiveness calculation unit calculates the effectiveness values for respective paths by using energy-aware coverage-preserving hierarchical routing (ECHR()) values calculated through matching between the interest information of the users of the destination nodes of the respective paths, included in the routing table received from the other external node, and the interest information set in the initial routing table.

2. The routing apparatus of claim 1, wherein, in the routing table, interest information of a user of the mobile node is set, and both interest information of users of destination nodes of respective paths, included in a routing table received from some other external node, and effectiveness values calculated based on the set interest information are set for the respective paths.

3. The routing apparatus of claim 1, wherein the effectiveness calculation unit calculates the effectiveness values for respective paths by applying the calculated ECHR( ) values to the following equation:

$$U(d) = \frac{\sum_{i \in I}(1-e)^{N_i} \cdot ECHR(I_i, I_d)}{h},$$

where I is a set of intermediate nodes exiting in a path to a destination node d, $I_i$ is an interest of each intermediate node, $I_d$ is an interest of the destination node, e is a link error rate, $N_i$ is a number of hops from the intermediate node I) to the destination node, and h is a number of hops to the destination node d.

4. The routing apparatus of claim 1, wherein when a destination node of a path of the initial routing table is not identical to a destination node of each path of the broadcasted routing table, the routing table management unit adds the path of the broadcasted routing table and an effectiveness value thereof to the initial routing table.

5. The routing apparatus of claim 1, wherein when a destination node of a path of the initial routing table is identical to a destination node of a relevant path of the broadcasted routing table, the routing table management unit updates the initial routing table by comparing an effectiveness value of the relevant path having the identical destination node with an effectiveness value set in the initial routing table.

6. An apparatus for processing contents based on matching between users' interests, comprising:
   a routing table for storing interest information of users and effectiveness values for respective paths;
   a routing path setting unit for searching for paths having a destination node identical to that included in a content request message or a content reply message attributable to an external content request, and sending the content request message or the content reply message through a path having a highest effectiveness value selected from among found paths; and
   a caching manager for storing contents, included in the content reply message, in a content storage by comparing the interest information of the users with characteristics of contents included in the content reply message when a node received through the content reply message is not a destination node.

7. The apparatus of claim 6, wherein the routing path setting unit selects a path having a small number of hops from among the found paths, or a shortest distance path when a link error rate is greater than a preset value.

8. A method of updating a routing table in each node in a mobile ad hoc network environment, comprising:
   a certain node receiving a specific path for which interest information of a user of a destination node and an effectiveness value thereof are set;
   calculating an effectiveness value by using ECHR( ) values calculated through matching between the interest information of the user of the destination node and interest information of a user of the certain node;
   setting the calculated effectiveness value in the specific path and adding the specific path to a routing table included in the certain node when the specific path is not present in the routing table; and
   updating paths included in the routing table by comparing the calculated effectiveness value with effectiveness values of paths included in the routing table when the specific path is present in the routing table.

9. A method of processing content, the method processing a content reply message using a routing table for storing interest information of users and effectiveness values for respective paths, comprising:
   when the content reply message is received, determining whether to cache content by comparing content characteristics of the content reply message with interest information of a user set in a routing table of a node which received the content reply message;
   when a destination node of the content reply message is the node which received the content reply message after determining whether to cache the content, notifying an application that requested content has been received; and
   when the destination node is not the node which received the content reply message, selecting a path having a highest effectiveness value from among paths having a destination node identical to that included in the received content reply message by searching the routing table, and then sending the content reply message through the selected path.

* * * * *